(12) United States Patent
Nordstrom et al.

(10) Patent No.: US 8,897,240 B2
(45) Date of Patent: Nov. 25, 2014

(54) METHODS AND APPARATUS FOR PHYSICAL UPLINK CONTROL CHANNEL (PUCCH) LOAD CONTROL BY PHYSICAL DOWNLINK CONTROL CHANNEL (PDCCH) RESTRICTIONS

(75) Inventors: Bjorn Nordstrom, Stockholm (SE); Carola Faronius, Jarfalla (SE); Anders Johansson, Hasselby (SE)

(73) Assignee: Telefonaktiebolage L M Ericsson (publ), Stockholm (SE)

( * ) Notice: Subject to any disclaimer, the term of this patent is extended or adjusted under 35 U.S.C. 154(b) by 607 days.

(21) Appl. No.: 13/144,811

(22) PCT Filed: Jan. 16, 2009

(86) PCT No.: PCT/SE2009/050033
§ 371 (c)(1),
(2), (4) Date: Aug. 25, 2011

(87) PCT Pub. No.: WO2010/082877
PCT Pub. Date: Jul. 22, 2010

(65) Prior Publication Data
US 2011/0299490 A1 Dec. 8, 2011

(51) Int. Cl.
*H04W 4/00* (2009.01)
*H04L 12/28* (2006.01)
*H04W 72/00* (2009.01)
*H04W 72/12* (2009.01)
*H04L 1/18* (2006.01)
*H04L 5/00* (2006.01)
*H04W 88/08* (2009.01)

(52) U.S. Cl.
CPC ......... *H04W 72/1289* (2013.01); *H04L 1/1861* (2013.01); *H04L 1/1887* (2013.01); *H04L 5/0007* (2013.01); *H04L 5/0053* (2013.01); *H04L 5/0055* (2013.01); *H04L 5/0058* (2013.01); *H04L 5/0062* (2013.01); *H04L 5/0073* (2013.01); *H04W 88/08* (2013.01)
USPC .......................... 370/329; 370/395.4; 455/450

(58) Field of Classification Search
None
See application file for complete search history.

(56) References Cited

U.S. PATENT DOCUMENTS 8,331,947 B2 * 12/2012 Kim et al. .................. 455/450
2002/0094814 A1 * 7/2002 Wigell et al. ................ 455/436

(Continued)

FOREIGN PATENT DOCUMENTS

JP 2009-512277 A 3/2009
JP 2009-164815 7/2009

OTHER PUBLICATIONS

LG Electronics, PUCCH ACK/NACK configuration and CCE index mapping. 3GPP TSG-RAN WG1 Meeting #52 R1-081003, Feb. 15, 1008, pp. 1-4, URL, http:www.3gpp.org/ftp/tsg_ran/WG1_RL1/TSGR1_52/Docs/R1-081003.zip.

(Continued)

*Primary Examiner* — Faruk Hamza
*Assistant Examiner* — Cassandra Decker
(74) *Attorney, Agent, or Firm* — Myers Bigel Sibley & Sajovec

(57) ABSTRACT

Methods for scheduling downlink (DL) data on a downlink subframe from a base station directed to at least one wireless terminal in a wireless network are provided. The methods include selecting a control channel element (CCE) region for a physical downlink control channel (PDCCH) carried in a control region of the downlink subframe; determining whether a DL assignment corresponding to the DL data can be allocated on the selected CCE region based on a load imposed on a corresponding physical resource block (PRB) of a physical uplink control channel (PUCCH) of a future uplink subframe that will carry an ACK/NACK response corresponding to the DL assignment; and allocating the DL assignment on the selected CCE region when it is determined that the DL assignment can be allocated.

12 Claims, 8 Drawing Sheets

(56) References Cited

U.S. PATENT DOCUMENTS

| | | | |
|---|---|---|---|
| 2007/0097981 A1* | 5/2007 | Papasakellariou | 370/394 |
| 2008/0311919 A1 | 12/2008 | Whinnett et al. | |
| 2009/0247174 A1* | 10/2009 | Zhang et al. | 455/450 |
| 2009/0247178 A1* | 10/2009 | Lunden et al. | 455/452.1 |
| 2011/0188381 A1* | 8/2011 | Kim et al. | 370/242 |
| 2011/0199997 A1* | 8/2011 | Wennstrom et al. | 370/329 |
| 2011/0212730 A1* | 9/2011 | Wennstrom et al. | 455/450 |

OTHER PUBLICATIONS

Office Action, Japanese Patent Application No. 2011-546225, Apr. 5, 2013 (with JP associate's summary).

International Search Report, PCT/SE2009/050033, Jan. 28, 2010.
3GPP: $3^{rd}$ Generation Partnership Project; Technical Specification Group Radio Access Network; Evolved Universal Terrestrial Radio Access (E-UTRA); Physical layer procedures (Release 8), Dec. 16, 2008, pp. 1-76.
Nokia Siemens Networks et al., "Signaling of Implicit ACK/NACK Resources," Athens, Greece, Aug. 20-24, 2007, pp. 1-7.
Lg Electronics, "PUCCH ACK/NACK configuration and CCE index/ mapping," Sorrento, Italy, Feb. 11-15, 2008, pp. 1-4.
Nokia Siemens Networks et al., "ACK/NACK Bundling Details for LTE TDD," Kansas City, MO, May 5-9, 2008, pp. 1-10.
Ericsson, "On ultiple ACK/NAK multiplexing on PUCCH for LTE TDD," Jeju, South Korea, Aug. 18-22, 2008, pp. 1-5.

* cited by examiner

METHODS AND APPARATUS FOR PHYSICAL UPLINK CONTROL CHANNEL (PUCCH) LOAD CONTROL BY PHYSICAL DOWNLINK CONTROL CHANNEL (PDCCH) RESTRICTIONS

CROSS-REFERENCE TO RELATED APPLICATIONS

This application is a 35 U.S.C. §371 national stage application of PCT International Application No. PCT/SE2009/050033, filed on Jan. 16, 2009, the disclosure and content of which is incorporated by reference herein as if set forth in its entirety. The above-referenced PCT International Application was published in the English language as International Publication No. WO 2010/082877 on Jul. 22, 2010.

FIELD

The disclosed technology relates to controlling load on the physical uplink control channel (PUCCH) through controlling placements of download data assignments on the physical downlink control channel (PDCCH).

BACKGROUND

Long Term Evolution (LTE) is a radio access technology (RAT) being standardized by the 3rd Generation Partnership Project (3GPP). In LTE, all services are supported through a packet switched (PS) domain. Downlink and uplink transmission in LTE use multiple access technologies—orthogonal frequency division multiple access (OFDMA) for the downlink, and single-carrier frequency division multiple access (SC-FDMA) for the uplink.

In both OFDMA and SC-FDMA, a large number of closely spaced orthogonal subcarriers are transmitted in parallel for signaling. Thus, the signaling is defined by both frequency and time components. In LTE, radio communication between a user equipment (UE) and an eNodeB is performed through defined radio frames. Each frame is 10 ms long and is divided into 10 subframes, each 1 ms long. Each subframe is subdivided into two slots each with 0.5 ms duration. Thus, a transmitted signal in each slot or subframe is defined by a resource grid of a number of subcarriers in the frequency domain and a number of symbols in the time domain.

In LTE, the radio resources for each UE is allocated in one or more physical resource blocks (PRB). Depending on the configuration, each PRB spans 12 or 24 subcarriers (also referred to as "tones") in the frequency domain and spans one slot (0.5 ms) in the time domain (6 or 7 OFDM or SC-FDMA symbols). One OFDM (or SC-FDMA) symbol on one subcarrier is referred to as a resource element (RE).

FIG. 1 which graphically represents an example uplink/downlink radio signaling. In this example, there are 12 consecutive subcarriers per PRB in the frequency domain. With a normal spacing of 15 kHz between adjacent subcarriers, the frequency bandwidth of the PRB is 180 kHz. The PRB also spans 7 symbols (OFDM or SC-FDMA) in the time domain. The PRB is the smallest unit of radio resource assigned by the eNodeB for any UE.

No dedicated data channels are used in LTE. Instead shared transport channel resources are used in both the downlink and the uplink communications between the eNodeB and the UEs. These shared transport channel resources—the downlink shared channel (DL-SCH) and the uplink shared channel (UL-SCH)—are each controlled by a scheduler on the eNodeB that assigns different parts of the downlink and uplink shared channels to different UEs for reception and transmission, respectively.

These shared transport channels DL-SCH and UL-SCH are respectively mapped to the physical downlink shared channel (PDSCH) on the downlink OFDM subframe and physical uplink shared channel (PUSCH) on the uplink SC-FDMA subframe. Both the PDSCH and the PUSCH are used primarily for data transport, and therefore, are designed to achieve high data rates.

The OFDM and the SC-FDMA subframes also respectively include the physical downlink control channel (PDCCH) and physical uplink control channel (PUCCH). The PDCCH is used to convey UE-specific downlink control information (DCI) from the eNodeB to the UEs. Similarly, the PUCCH is used to carry uplink control information (UCI) from the UEs to the eNodeB such as channel quality indication (CQI) reports, ACK/NACK responses, and scheduling requests (SR).

In addition to the physical channels PDSCH and PDCCH, the OFDM subframe also carries other physical channels including the physical broadcast channel (PBCH), the physical multicast channel (PMCH), the physical control format indicator channel (PCFICH), and the physical hybrid ARQ indicator channel (PHICH). The physical channels carry data from higher layers.

The OFDM subframe further carries physical signals, which are generated in layer 1 for use in system synchronization, cell identification, and radio channel estimation. The physical signals include the primary synchronization signal (P-SCH), the secondary synchronization signal (S-SCH), and the reference signal (RS). Unlike the physical channels, the physical signals are not used to carry data originating from higher layers.

In general, the physical channels PDCCH and the PDSCH occupy a significant majority of the OFDM subframe. Thus, for simplicity, the OFDM subframe in FIG. 2 is illustrated as being shared by the PDCCH and the PDSCH.

The PDCCHs are transmitted in a control region of every OFDM subframe. The control region comprises a first few (1, 2, 3 or 4) OFDM symbols of the downlink subframe, and is divided into one or more control channel elements (CCE). The number of CCEs available for PDCCHs depends on configuration parameters such as bandwidth and the number of OFDM symbols for the control region. Each PDCCH is sent on an aggregation of 1, 2, 4 or 8 CCEs. The downlink subframe not used for PDCCH can be used for PDSCH to carry data.

On the uplink, physical channels and signals are carried on the SC-FDMA frame. The roles of the uplink physical channels and signals are similar to the downlink counterparts in that the physical channels are used to carry data originating from the higher layers and the physical signals are used for layer 1 purposes. In addition to the PUSCH and the PUCCH, the uplink physical channels include the physical random access channel (PRACH). The uplink physical signal includes the reference signal (RS).

FIG. 3 illustrates a simplified view of the SC-FDMA subframe. The view is simplified in that only the PUSCH and PUCCH resources are illustrated. That is, the SC-FDMA subframe is viewed as being shared primarily between the PUCCH and PUSCH. The PUSCH resource occupies the middle subcarriers of the SC-FDMA frequency spectrum. On the spectrum band edges, a control region is located on which the PUCCH is transmitted. The PUCCH carries uplink control information including CQI reports, SR, and ACK/NACK (also referred to as HARQ-ACK).

To enable efficient resource utilization on the PUCCH, the SR, CQI, and ACK/NACK responses of several UEs are multiplexed on the PUCCH through code division multiplexing (CDM). This allows several UEs to share one PUCCH PRB. As an example, for an SC-FDMA subframe with normal cyclic prefix (CP), up to 12 different UEs may share one PUCCH PRB for CQI reporting. For the extended CP, 8 UEs may share one PRB also for CQI reporting. For SR and ACK/NACK responses, up to 36 different UEs may share one PRB for the normal CP, and 24 for the extended CP.

There are problems related to the use of CDM on the PUCCH. The planned deployment for the LTE is a reuse-one network in which the same frequency band is reused for each cell in the network. In a reuse-one network, inter-cell interference is typically a limiting factor. Moreover, time dispersion may lead to intra-cell interference. Both interference types grow with the number of utilized resources, i.e., CDM codes, per PRB. If not controlled, the interference may lead to seriously degraded overall system performance.

The 3GPP standardized solution provides only one option to reduce the load per PUCCH PRB for SRs and ACK/NACK feedback reports. The option is to make only one half or one third of the resources available for use. In other words, PUCCH is allocated, but not all of the allocated resource is used for PUCCH transmission.

One disadvantage of the existing standardized load control is that the throughput on the PUSCH is reduced. Since the SC-FDMA subframe is essentially a fixed resource, more of the subframe resource dedicated to PUCCH means that there is less resource available for PUSCH. Configuring the PUCCH with this option effectively increases the bandwidth reserved for PUCCH by a factor of two or three, which can significantly reduce the bandwidth for the PUSCH. In addition, the standardized load control is unlikely to reduce the interference level sufficiently.

SUMMARY

In one aspect, the load on the PUCCH is controlled in terms of utilized resources per PRB. The base station has exact knowledge of the mapping from a PDCCH CCE index of the downlink subframe to the PUCCH resource index for transmission of ACK/NACK responses and the corresponding PRB of the uplink subframe. By controlling the placements of the downlink (DL) assignments on the PDCCH, the load on the PUCCH can be controlled.

In one embodiment, a scheduler of a base station implements a method to schedule a downlink (DL) data on a downlink subframe to control the load on the PUCCH. The downlink subframe is directed to one or more wireless terminals in a wireless network. The downlink subframe includes a control region on which the PDCCH can be carried. The control region includes one or more control channel element (CCE) regions.

The PDCCH is configured so that the PDCCH maps to one or more CCE regions of the control region. Each CCE region of the PDCCH maps to a PUCCH PRB of an uplink subframe such that for each DL assignment allocated in the CCE region, the mapped PUCCH PRB carries an ACK/NACK response from a recipient wireless terminal due to the DL assignment.

In the method, the scheduler selects a CCE region from the PDCCH of the control region of the downlink subframe. After selecting the CCE region, the scheduler determines whether a DL assignment corresponding to the DL data can be allocated on the selected CCE region. The scheduler can make the determination based on a load that will be imposed on a corresponding PUCCH PRB of a future uplink subframe that will carry an ACK/NACK response corresponding to the DL assignment. The scheduler then allocates the DL assignment on the selected CCE region when it determines that the DL assignment can be allocated. Otherwise, the scheduler selects another CCE region to repeat the process.

The scheduler can determine whether or not to allocate the DL assignment on the selected CCE region based on a load capacity of the selected CCE region itself. In this aspect, the scheduler determines a DL load of the selected CCE region. In one alternative, the DL load is determined based on an amount of resources in the selected CCE region already allocated to carry other DL assignments that require ACK/NACK responses. In another alternative, the DL load is determined based on a number of other DL assignments already allocated in the selected CCE region that require ACK/NACK responses.

When the DL load is below a maximum DL load threshold, the scheduler determines that the DL assignment can be allocated on the selected CCE region. The maximum DL load threshold can be preset for all CCE regions or can be individually set for each CCE region based on some considerations.

The scheduler can also determine whether or not to allocate the DL assignment based on a load capacity of the PUCCH PRB corresponding to the selected CCE region. In this aspect, the scheduler determines an uplink (UL) load of the corresponding PUCCH PRB. For example, the UL load can be based on a number of ACK/NACK responses already scheduled to be carried by the corresponding PUCCH PRB.

When the UL load of the corresponding PUCCH PRB is below a maximum UL load threshold, the scheduler determines that the DL assignment can be allocated on the selected CCE region. The maximum UL load threshold can be preset for all PUCCH PRBs or can be individually set for the corresponding PUCCH PRB based on some considerations.

There are several benefits. First, more flexible load control scheme of the PUCCH dynamic region is provided. The scheme allows for adaptive control of the PUCCH utilization. Hence, inter-cell and intra-cell interference may be controlled while improving the overall system throughput. Also, the PUCCH load may be controlled independently of the PUCCH configuration. This means that the bandwidth reserved for PUCCH may be minimized while still allowing for load control. This improves the system throughput even further.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
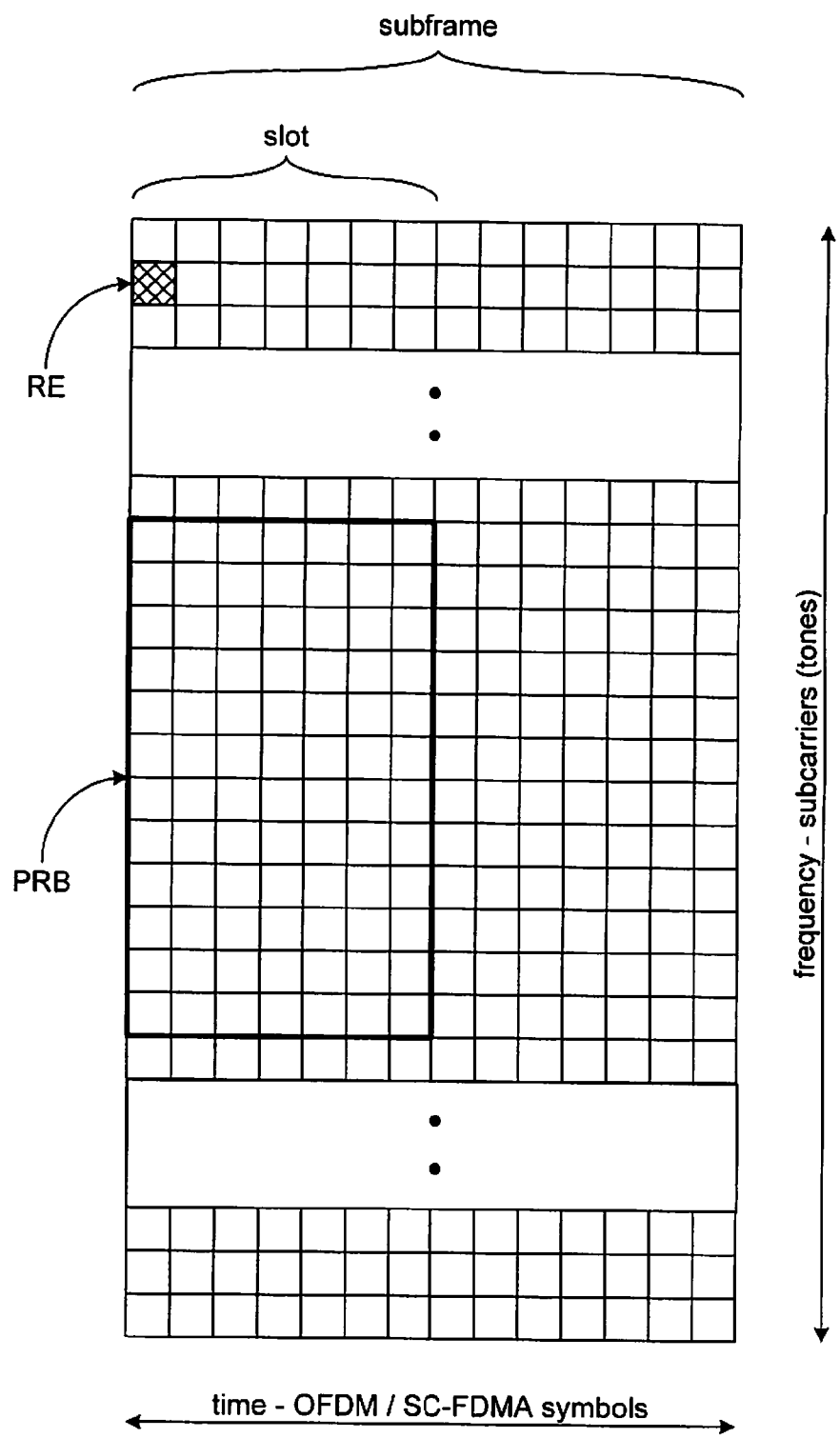
FIG. 1 illustrates a subframe of an LTE frame.
Figure 2:
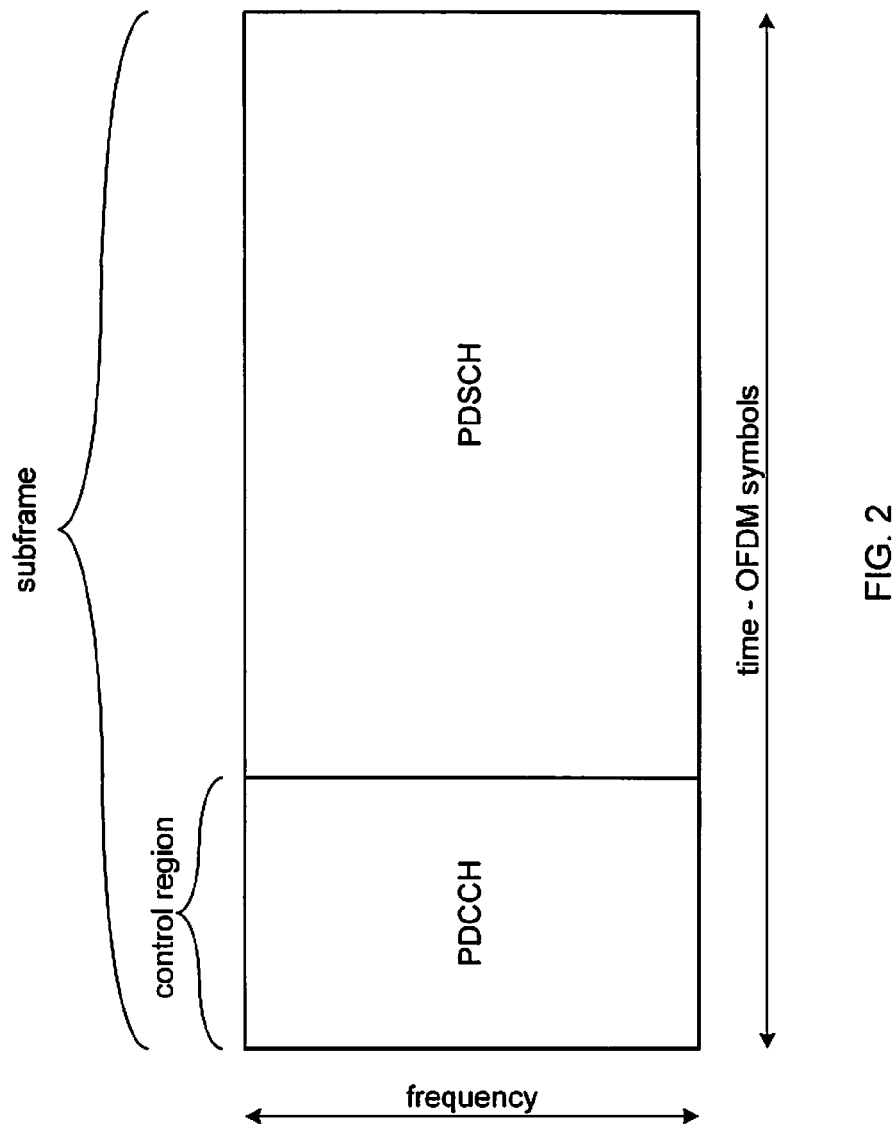
FIG. 2 illustrates a simplified downlink OFDM subframe in LTE allocated between PDCCH and PDSCH.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In the description below, 3GPP network, and in particular, the LTE is used for explanation. However, the scope is not so limited. The concepts described herein may be applicable to other wireless network types. Thus, while the term PUCCH is used, the term can also refer to any physical channel in a network capable of transferring control signals in an uplink direction from the wireless terminals (e.g., user equipments) to the base station (e.g., eNodeB) of a wireless network (e.g., LTE). Similarly, the term PDCCH can refer to any physical channel in the network capable of transferring control signals in a downlink direction from the base station to the wireless terminals.

Figure 4:
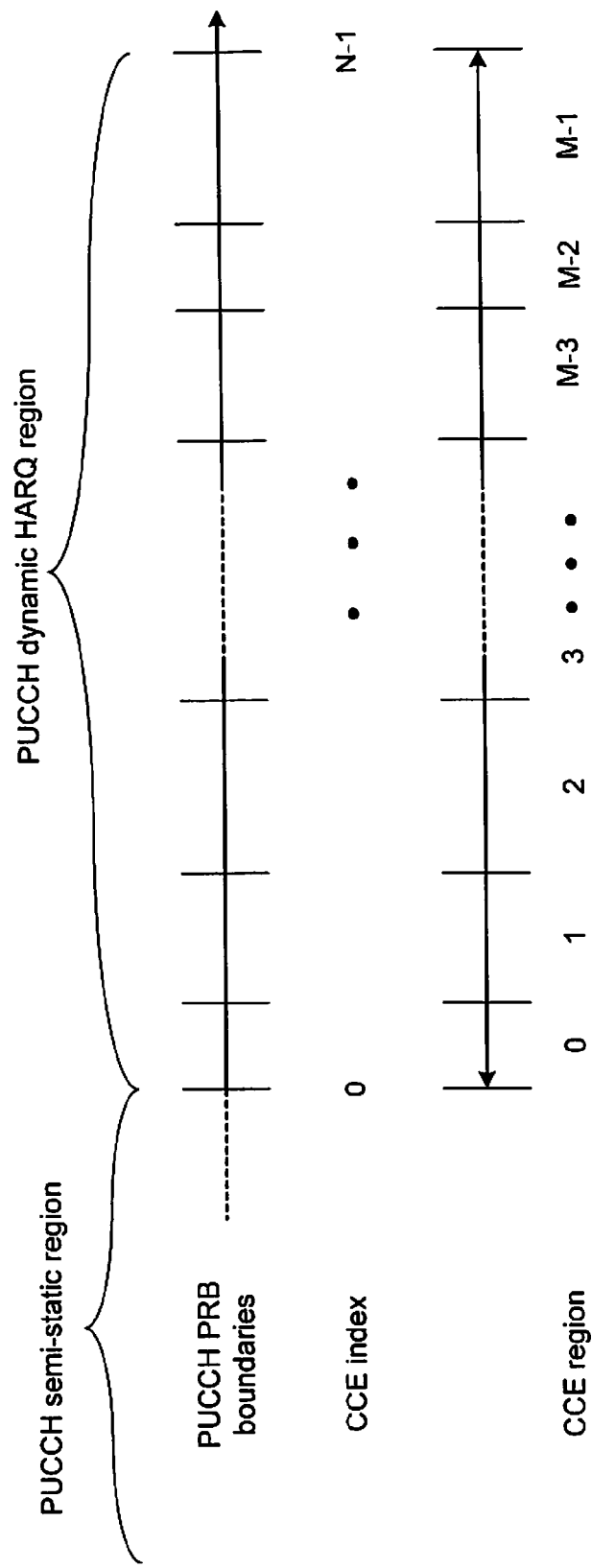
FIG. 4 illustrates an example mapping of CCE indexes of the CCE regions in the downlink subframe to PRBs of the uplink subframe.

There can be both semi-statically and dynamically configured PUCCH resources as illustrated in FIG. 4. Semi-statically allocated resources are those which are valid for the wireless terminal connected to the base station until the wireless terminal loses synchronization, ends the service session, performs a handover, or if the resource is otherwise revoked. Examples of semi-static resources include channel status reports (e.g., CQIs), scheduling requests (SRs), and semi-static ACK/NACKs.

The dynamically allocated resources, on the other hand, are valid only for a specific time period such as one slot or subframe. For the most part, the ACK/NACK resources for the wireless terminals are dynamically allocated so that each recipient wireless terminal may provide responses to downlink (DL) data directed to the wireless terminal carried on the PDSCH on a previously received downlink (e.g., OFDM) subframe. The recipient wireless terminal can identify the placement of the DL data on the PDSCH directed to it by reading a corresponding DL assignment on the PDCCH.

Figure 3:
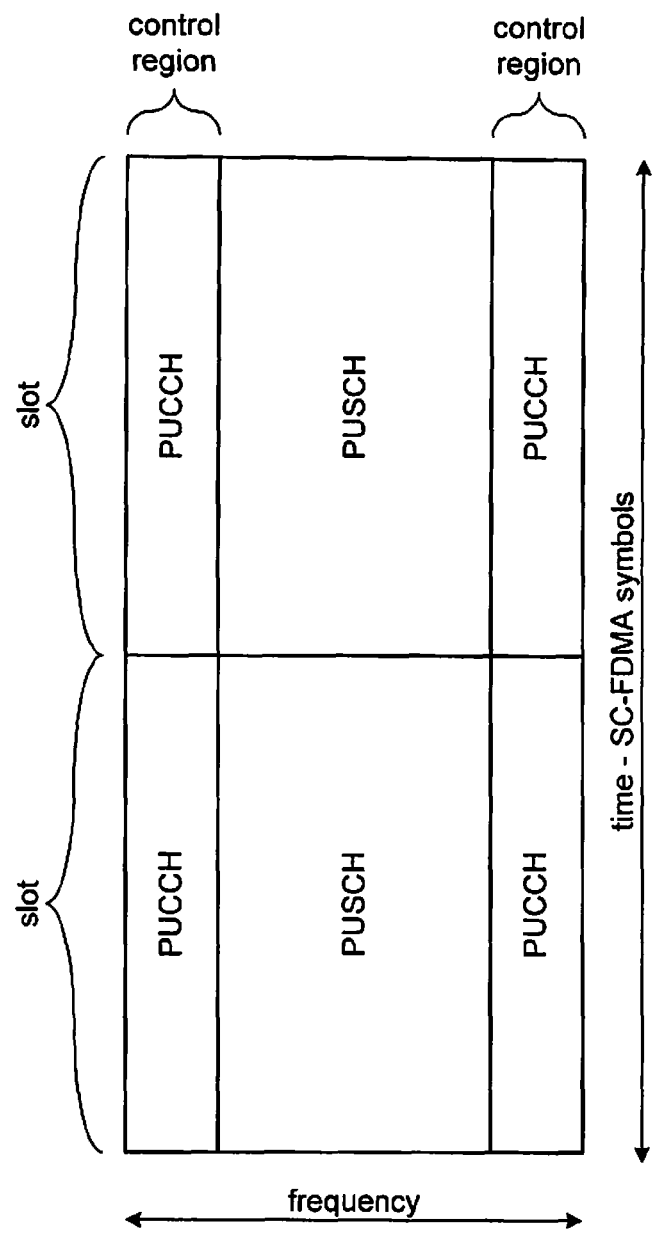
FIG. 3 illustrates a simplified uplink SC-FDMA subframe in LTE allocated between PUCCH and PUSCH.

As illustrated in FIG. 3 and as noted above, the uplink SC-FDMA subframe is primarily shared between the PUCCH and the PUSCH. This means that when more uplink resources are allocated to the PUCCH, less resources are available for the PUSCH and vice versa. Whereas the PUSCH is primarily utilized to transfer user data, the PUCCH is solely used to transfer control signalling, which is overhead related to the radio transmission.

Thus, to increase data throughput, the PUSCH allocation should increase. This can be accomplished by an aggressive allocation of the PUCCH, e.g., assigning many CDM codes to share one PUCCH PRB so that many wireless terminals can simultaneously transmit the CQI reports, SRs, and ACK/NACK responses on the same time-frequency resource of the uplink subframe. However, many wireless terminals simultaneously using the same time-frequency resource carries a risk of unacceptable error probability for the transmissions from the wireless terminals, which in turn would decrease the system and/or user throughput and degrade overall system performance which is the opposite of the desired effect.

On the other hand, an unnecessarily cautious allocation—either through an increase in the amount of resources allocated to the PUCCH or a reduction of the amount of signaling sent on the PUCCH—also carries risks. Increase in the PUCCH allocation correspondingly reduces the amount of uplink resources available for the PUSCH, which can lead to reduced data throughput. A reduction in the signaling amount can lead to a performance degradation due to delay (sparser SR opportunities), less accurate channel information (sparser CQI reports) and restrictions on the scheduler (less flexibility in the number of ACK/NACK responses).

By appropriately sizing the PUCCH and PUSCH, a good tradeoff between maximizing the data throughput and minimizing interferences can be achieved. In particular, the load on each PUCCH PRB can be controlled so that no one PRB is scheduled to carry too much uplink control information, which minimizes interferences. Also, when the load on the PRBs can be individually controlled, the PUCCH can be properly allocated since the over-allocation of the PRBs can be avoided. This maximizes the PUSCH allocation to increase throughput. Unfortunately, the eNodeB scheduler does not directly schedule the responses from the wireless terminals on the uplink PRBs in LTE.

One way to control the load on the uplink PUCCH PRBs is through an indirect method. As illustrated in FIG. 4, there is a relationship between the placements of the dynamic DL assignments on the CCE regions of the PDCCH and the selection of the particular PUCCH PRBs that will carry the dynamic ACK/NACK responses corresponding to the dynamic DL assignments. Further, the HARQ feedback reports, made up of the ACK/NACK responses from the wireless terminals to previously received downlink data (on the PDSCH) are assigned to be transmitted in a dynamic region of the PUCCH.

The mapping of the PRBs that carry the ACK/NACK responses in this dynamic PUCCH region is derived from a start index of the CCEs carrying the PDCCH control information of the corresponding received DL data for the wireless terminal, and the scheduler has the exact mapping knowledge. Thus, in one aspect, the scheduler uses the mapping knowledge to optimize the tradeoff between minimizing intra- and inter-cell interferences and maximizing data throughput. Since the scheduler directly schedules the DL assignments, the scheduler can use the mapping knowledge to indirectly control, or at least influence, the load of individual PUCCH PRBs on the uplink.

In this aspect, the load in terms of utilized resources (e.g., CDM codes) per PUCCH PRB is controlled by appropriate scheduling on the PDCCH, e.g, by appropriately scheduling the DL assignments on the CCE regions. In particular, the load on the dynamic part of the PUCCH region is indirectly controlled by scheduling the allocation of dynamic DL assignments requiring ACK/NACK responses from the wireless terminals on the CCE regions of the downlink subframe. By properly placing the allocation of the DL assignments, the number of wireless terminals simultaneously sharing any one PRB on the PUCCH through CDM can be limited.

In one example process, a PUCCH PRB that will carry the ACK/NACK response corresponding to a potential DL assignment on PDCCH is identified. By storing information of DL assignments performed on a downlink subframe, control can be applied such that no more than a predetermined maximum number of resources (e.g., CDM codes) will be utilized in any one PUCCH PRB. In this manner, the load on the dynamic part of the PUCCH region can be controlled.

This is explained with reference to FIG. 4 which illustrates a mapping of PUCCH PRBs of the SC-FDMA (uplink) subframe to the CCE regions of the OFDM (downlink) subframe. The CCE indexes are mapped to the CCE regions based on a number of CCEs in the downlink subframe and the PUCCH configuration. For a given control region in a downlink subframe, the available CCE indexes are divided into a number of CCE regions. That is, the CCE indexes are divided such that the control region includes one or more CCE regions.

The PDCCH is carried in the control region. The PDCCH is configured to map to one or more CCE regions of the control region. The CCE regions are configured so that each CCE region in the PDCCH can be defined as a set of CCE indexes corresponding to the ACK/NACK responses assigned to a same PUCCH PRB. In other words, for each DL assignment allocated on the CCE region of the PDCCH, the same PUCCH PRB will carry the corresponding ACK/NACK response. The CCE indexes that are grouped into a CCE region depend both on the number of CCEs and the configuration of PUCCH.

Each CCE region of the PDCCH is allocated a capacity specified as a number of allowed DL data assignments per subframe. The values of the capacities may be individually set or related to each other. These values can either be set to some constant value or be allowed to adapt to the estimated PUCCH channel quality. Preferably, special care should be taken when allocating capacity to the first CCE region. This is because the corresponding PUCCH PRB may be shared with semi-statically configured resources.

Before a DL data assignment is mapped on the PDCCH, the residual capacity of the corresponding CCE region is checked. The CCE region of interest is derived from the start index of the potential CCE assignment. If the indicated load is lower than the capacity, the DL assignment placement is performed and the load on the corresponding CCE region load is increased. If the load is at or above the capacity, the DL assignment is not placed on the given CCE region. Following these restrictions can guarantee that the PUCCH load never exceeds the allowed capacity.

Figure 5:
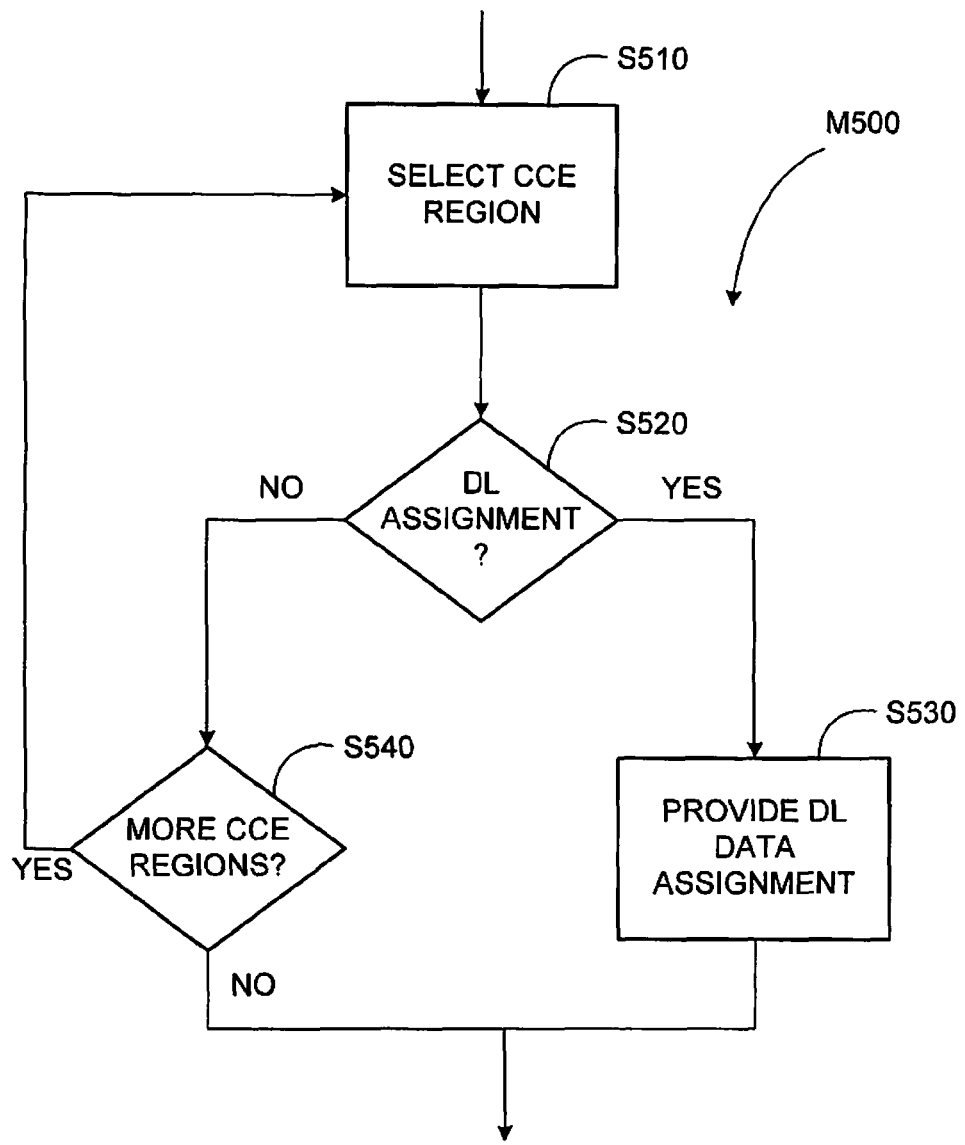
FIG. 5 illustrates an example method to schedule a downlink data assignment on a downlink subframe.

FIG. 5 illustrates an example method M500 to schedule a downlink (DL) data on a downlink subframe from a base station directed to one or more wireless terminals in a wireless network. When the wireless network is an LTE network, i.e., a 3GPP network, the base station is referred to as the eNodeB. In step S510, a control channel element (CCE) region from a PDCCH carried in a control region of the downlink subframe is selected.

In step S520, a determination is made whether or not a DL assignment corresponding to the DL data can be allocated on the selected CCE region. If so, the DL assignment allocation on the selected CCE region is performed in step S530. Otherwise, in step S540, it is determined whether or not there are other CCE regions. If so, the process repeats by selecting one of the other CCE regions.

In this method, the DL assignment requires an ACK/NACK response in a future uplink subframe from an intended recipient wireless terminal. That is, the DL assignment is dynamically allocated. In step S520, the determination of whether the DL assignment can be allocated on the selected CCE region can be made based on the load that will be imposed on the corresponding PUCCH PRB that will carry the ACK/NACK response from the recipient wireless terminal due to the DL assignment.

Recall that the PDCCH maps to one or more CCE regions of the control region. Thus, the selected CCE region in the method is one of the CCE regions mapped to the PDCCH. Also recall that the CCE regions are configured such that each CCE region of the PDCCH maps to a PUCCH PRB of an uplink subframe such that for each DL assignment allocated on the CCE region, the mapped PUCCH PRB carries an ACK/NACK response from an intended recipient wireless terminal due to the DL assignment allocated in the DL region.

Figure 6:
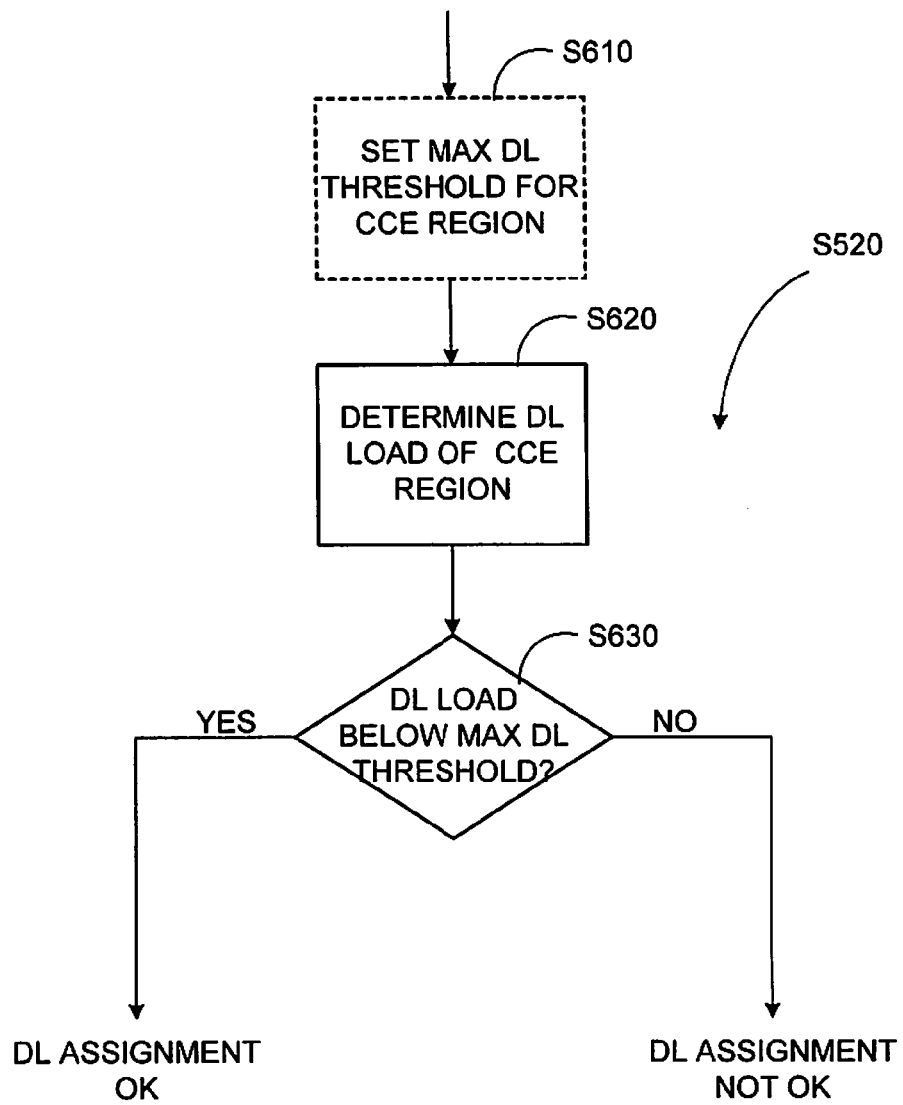
FIG. 6 illustrates an example process to determine whether a DL assignment can be allocated on a selected CCE region.

In FIG. 5, the allocation of the DL assignment on the selected CCE region in step S530 occurs when it is determined that the DL assignment is possible in step S520. FIG. 6 illustrates an example process to implement the step S520. The process in FIG. 6 includes the step S620 of determining a downlink (DL) load of the selected CCE region. In one respect, the DL load of the selected CCE region can be determined based on an amount of resources in the selected CCE region already allocated to carry one or more other DL assignments that require corresponding one or more ACK/NACK responses from one or more recipient wireless terminals. In another respect, the DL load can be based on a number of one or more other DL assignments already allocated in the selected CCE region that require corresponding one or more ACK/NACK responses from one or more recipient wireless terminals.

After determining the DL load for the selected CCE region, the process determines whether the DL load is below a maximum DL load threshold in step S630. If the DL load is below the maximum, then the DL assignment can be allocated to selected CCE region. Otherwise, the DL assignment can not be allocated.

In a simple implementation, the maximum DL load threshold can be set to be the same for all CCE regions. However, the maximum DL load threshold can be set individually for each CCE region (step S610). There can be different considerations for individually setting the maximum DL load threshold. In one example, the PUCCH PRB corresponding to the first CCE region could be shared with semi-statically configured resources. In this case, the number of dynamic DL assignments that can be allocated to the first CCE region maybe affected due to the sharing. Another consideration can be the channel quality of the PUCCH of the uplink subframe. The maximum DL load threshold may be increased as the quality of the channel increases and vice versa.

In other instances, the scheduler can calculate ahead of time a total number DL assignments that will be made for a downlink subframe. Then the maximum DL load threshold can be set to distribute the DL assignments substantially evenly among the CCE regions. The scheduler can also determine the number of ACK/NACK responses expected in any future uplink subframe. The scheduler can set the threshold levels for each CCE region so as to distribute the ACK/NACK responses substantially evenly among the PRBs of the future uplink subframes. Any combination of these and other considerations may be taken into account to set the maximum DL load threshold for each CCE region.

Figure 7:
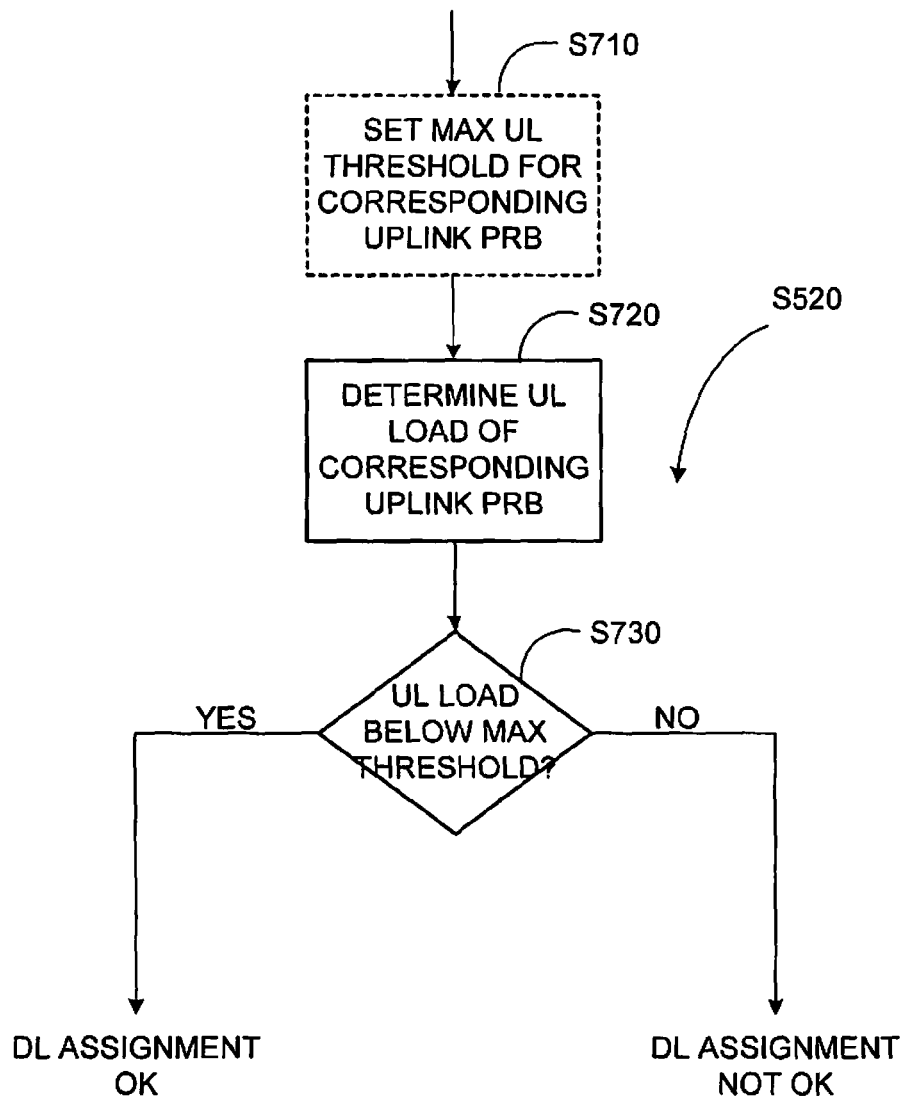
FIG. 7 illustrates another example process to determine whether a DL assignment can be allocated on the selected CCE region.

The process illustrated in FIG. 6 determines whether or not the DL assignment can be allocated on the selected CCE region based on the downlink load capacity of the selected CCE region itself. However, a similar determination can also be made based on the uplink load capacity of the PUCCH PRB corresponding to the selected CCE region. This is illustrated in FIG. 7, which is a flow chart of another example process to implement the step S520.

In this process, an uplink (UL) load of the corresponding PUCCH PRB is determined in step S720. Then in step S730, it is determined whether the UL load of the corresponding PUCCH PRB is below a maximum UL load threshold. The DL assignment can be allocated to the selected CCE region if the UL load of the corresponding PUCCH PRB is below the maximum UL load threshold. Otherwise, the DL assignment cannot be allocated to the selected CCE region. The UL load of the corresponding PUCCH PRB can be based on a number of ACK/NACK responses already scheduled to be carried by the corresponding PUCCH PRB.

The maximum UL load threshold can be set to be the same for all PUCCH PRBs or can be individually set for the PUCCH PRBs (see step S710). Much of the same considerations—the channel quality of the PUCCH, amount of semi-statically allocated uplink control information resources already scheduled for the corresponding PUCCH PRB, a total number of DL assignments for the downlink subframe, a total number of ACK/NACK responses expected to be carried on the future uplink subframe, etc.—may be taken into account to determine the maximum UL load threshold for the corresponding PUCCH PRB.

Figure 8:
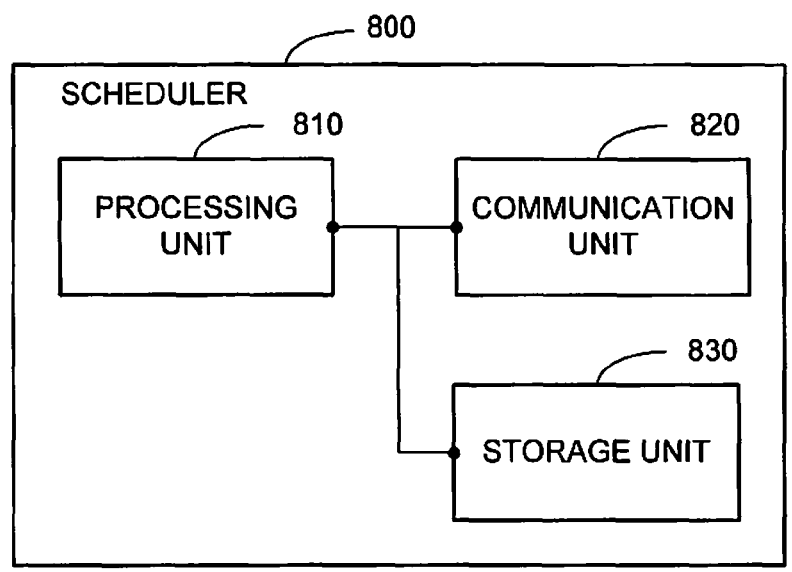
FIG. 8 illustrates an example embodiment of a scheduler of a base station.

FIG. 8 illustrates an embodiment of a scheduler of the base station arranged to carry out the methods in steps described above. The scheduler 800 includes a processing unit 810, a communication unit 820, and a storage unit 830. The communication unit 820 is arranged to receive downlink data destined to the wireless terminals from a gateway node of the wireless network. The storage unit 830 is arranged to buffer the downlink data as well as to store scheduling information. The processing unit 810 is arranged to provide the scheduling services and controls the communication unit 820 and the storage unit 830 to perform the methods and processes described above.

One of many advantages of the example embodiments and methods is that a more flexible load control scheme of the PUCCH dynamic region is possible than the method supplied by the existing 3GPP standard. The adaptive control of the PUCCH utilization allows the inter-cell and the intra-cell interferences to be controlled, to thereby improve overall system throughput. In addition, the PUCCH load can be controlled independently of the PUCCH configuration. This means that the bandwidth reserved for the PUCCH can be minimized while still allowing for ample load control. This will improve the system throughput even further.

For a given CCE aggregation level, a PDCCH candidate may be placed on a number of CCE positions given by a search space defined by the 3GPP standard. The search spaces vary with CCE aggregation level, Radio Network Temporary Identification (RNTI) and subframe number. In addition, it is expected that a large number of PDCCH candidates are available for scheduling in each subframe. Taken this into account, the imposed control restrictions are unlikely to have a major negative impact either on the number of users that may be successfully scheduled on PDCCH or that a single user may be locked out over time.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for scheduling downlink (DL) data on a downlink subframe from a base station directed to at least one wireless terminal in a wireless network, the method comprising:

selecting a control channel element (CCE) region for a physical downlink control channel (PDCCH) carried in a control region of the downlink subframe;

determining whether a DL assignment corresponding to the DL data can be allocated on the selected CCE region based on a load imposed on a corresponding physical resource block (PRB) of a physical uplink control channel (PUCCH) of a future uplink subframe that will carry an ACK/NACK response corresponding to the DL assignment; and allocating the DL assignment on the selected CCE region when the DL assignment can be allocated, wherein determining whether the DL assignment can be allocated on the selected CCE region comprises:

determining an uplink (UL) load of the corresponding PUCCH PRB; and determining whether the UL load of the corresponding PUCCH PRB is below a maximum UL load threshold;

wherein the DL assignment can be allocated on the selected CCE region when the UL load of the corresponding PUCCH PRB is below the maximum UL load threshold;

wherein the DL assignment cannot be allocated on the selected CCE region when the UL load of the corresponding PUCCH PRB is not below the maximum UL load threshold; and wherein the UL load of the corresponding PUCCH PRB is determined based on a number of ACK/NACK responses already scheduled to be carried by the corresponding PUCCH PRB.

2. The method of claim 1:

wherein the PDCCH is mapped to at least one CCE region of the control region; and wherein each CCE region of the control region maps to a PUCCH PRB of an uplink subframe such that for each DL assignment allocated on the CCE region, the mapped PUCCH PRB carries an ACK/NACK response from an intended recipient wireless terminal due to the DL assignment allocated on the CCE region.

3. The method of claim 1, further comprising:

determining if the DL assignment may be allocated to at least one other CCE region in the PDCCH when the DL assignment cannot be allocated on the selected CCE region; and repeating the selecting, determining, and allocating when the DL assignment may be allocated to at least one other CCE region.

4. The method of claim 1, further comprising setting the maximum UL load threshold for the corresponding PUCCH PRB prior to determining whether the UL load for the corresponding PUCCH PRB is below the maximum UL load threshold.

5. The method of claim 4, wherein setting the maximum UL load threshold for the corresponding PUCCH PRB comprises setting the maximum UL load threshold based on a consideration of at least one of:

a channel quality of the PUCCH of the uplink subframe;

an amount of semi-statically allocated uplink control information resources already scheduled to be carried by the corresponding PUCCH PRB;

a total number of DL assignments for the downlink subframe; and a total number of ACK/NACK responses expected to be carried on the future uplink subframe.

6. The method of claim 1, wherein the wireless network is a 3GPP network.

7. A scheduler of a base station of a wireless network configured to schedule a downlink (DL) data on a downlink subframe directed to at least one wireless terminal, the scheduler comprising:

a communication unit configured to receive downlink data for the at least one wireless terminal from a gateway node of the wireless network;

a storage unit configured to buffer the downlink data; and a processing unit configured to control the communication unit and the storage unit to provide scheduling services, wherein the processing unit is configured to:

select a control channel element (CCE) region for a physical downlink control channel (PDCCH) carried in a control region of the downlink subframe;

determine whether a DL assigmnent corresponding to the DL data can be allocated on the selected CCE region based on a load that will be imposed on a corresponding physical resource block (PRB) of a physical uplink control channel (PUCCH) of a future uplink subframe that will carry an ACK/NACK response corresponding to the DL assignment; and allocate the DL assignment on the selected CCE region when the processing unit determines that the DL assignment can be allocated, wherein the processing unit is configured to:

determine an uplink (UL) load of the corresponding PUCCH PRB;

determine that the DL assignment can be allocated on the selected CCE region when the UL load of the corresponding PUCCH PRB is below a maximum UL load threshold; and determine that the DL assignment cannot be allocated on the selected CCE region when the UL load of the corresponding PUCCH PRB is not below the maximum UL load threshold;

wherein the processing unit is configured to determine the UL load of the corresponding PUCCH PRB based on a number of ACK/NACK responses already scheduled to be carried by the corresponding PUCCH PRB.

8. The scheduler of claim 7, wherein the PDCCH is mapped to at least one CCE region of the control region; and wherein each CCE region of the control region maps to a PUCCH PRB of an uplink subframe such that for each DL assignment allocated on the CCE region, the mapped PUCCH PRB carries an ACK/NACK response from an intended recipient wireless terminal due to the DL assignment allocated on the CCE region.

9. The scheduler of claim 7, wherein the processing unit is configured to:

determine whether the DL assignment may be allocated to at least one other CCE region of the PDCCH when the DL assignment cannot be allocated on the selected CCE region; and when the DL assignment can be allocated to at least one other CCE region, repeat the process to select another CCE region, determine whether the DL assignment on the another CCE region is possible, and allocate the DL assignment on the another CCE region based on the determination of whether the DL assignment on the another CCE region is possible.

10. The scheduler of claim 7, wherein the processing unit is configured to set the maximum UL load threshold for the corresponding PUCCH PRB prior to determining whether the UL load for the corresponding PUCCH PRB is below the maximum UL load threshold.

11. The scheduler of claim 10, wherein the processing unit is configured to set the maximum UL load threshold for the corresponding PUCCH PRB in a consideration of at least one of:

a channel quality of the PUCCH of the uplink subframe;

an amount of semi-statically allocated uplink control information resources already scheduled to be carried by the corresponding PUCCH PRB;

a total number of DL assignments for the downlink subframe; and a total number of ACK/NACK responses expected to be carried on the future uplink subframe.

12. The scheduler of claim 7, wherein the wireless network is a 3GPP network.

* * * * *

UNITED STATES PATENT AND TRADEMARK OFFICE
CERTIFICATE OF CORRECTION

PATENT NO. : 8,897,240 B2
APPLICATION NO. : 13/144811
DATED : November 25, 2014
INVENTOR(S) : Nordstrom et al.

Page 1 of 1

It is certified that error appears in the above-identified patent and that said Letters Patent is hereby corrected as shown below:

On the Title Page, in item (75), under "Inventors", in Column 1, Line 2, delete "Jarfalla" and insert -- Järfälla --, therefor.

On the Title Page, in item (75), under "Inventors", in Column 1, Line 3, delete "Hasselby" and insert -- Hässelby --, therefor.

On the Title Page, in item (73), under "Assignee", in Column 1, Line 1, delete "Telefonaktiebolage" and insert -- Telefonaktiebolaget --, therefor.

On the Title Page, in the Figure, delete " " and insert -- --, therefor. 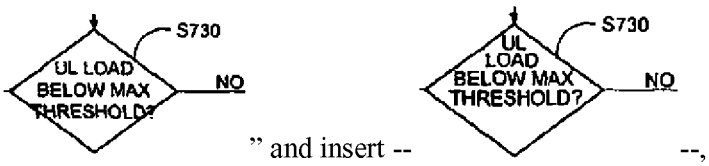

In the Drawings

In Fig. 7, Sheet 7 of 8, delete " " and insert -- --, therefor. 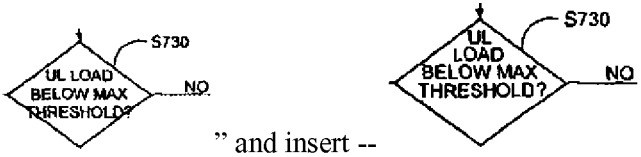

Signed and Sealed this
Twenty-ninth Day of September, 2015

Michelle K. Lee
*Director of the United States Patent and Trademark Office*